US008115961B2

(12) United States Patent
Nakamura et al.

(10) Patent No.: US 8,115,961 B2
(45) Date of Patent: Feb. 14, 2012

(54) METHOD AND APPARATUS PROVIDING CONSISTENT ROTATION FOR PAGES IN A JOB IN ACCORDANCE WITH POST-PROCESSING REQUIREMENTS

(75) Inventors: Shoichi Nakamura, Hachioji (JP); Takao Kurohata, Hino (JP); Hiroshi Yamaguchi, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1299 days.

(21) Appl. No.: 11/397,729

(22) Filed: Apr. 5, 2006

(65) Prior Publication Data

US 2007/0014611 A1 Jan. 18, 2007

(30) Foreign Application Priority Data

Jul. 15, 2005 (JP) ................................ 2005-206852

(51) Int. Cl.
*G06K 15/00* (2006.01)

(52) U.S. Cl. ..... 358/1.18; 347/262; 358/1.13; 358/1.15; 358/448; 399/381; 399/407; 399/410; 399/81

(58) Field of Classification Search .................. 358/1.18
See application file for complete search history.

(56) References Cited

U.S. PATENT DOCUMENTS

| | | | | |
|---|---|---|---|---|
| 5,038,218 | A * | 8/1991 | Matsumoto | 358/296 |
| 5,301,036 | A * | 4/1994 | Barrett et al. | 358/448 |
| 5,481,353 | A * | 1/1996 | Hicks et al. | 399/382 |
| 6,091,929 | A * | 7/2000 | Yamazaki et al. | 399/410 |
| 6,456,732 | B1 * | 9/2002 | Kimbell et al. | 382/112 |
| 2003/0052441 | A1 * | 3/2003 | Nakagiri | 270/37 |
| 2003/0159114 | A1 * | 8/2003 | Nishikawa et al. | 715/530 |
| 2004/0114954 | A1 * | 6/2004 | Ohtani | 399/82 |

* cited by examiner

*Primary Examiner* — King Poon
*Assistant Examiner* — David S Cammack
(74) *Attorney, Agent, or Firm* — Finnegan, Henderson, Farabow, Garrett & Dunner, L.L.P.

(57) ABSTRACT

In the image forming system, there is provided an image processing section which determines a rotation standard for rotating image information so that an orientation of an image which is to be formed on an output medium on which prescribed post processing is not to be conducted agrees with an orientation of an image formed on an output medium on which prescribed post processing is to be conducted, if a booklet division mode is set by the setting section, and which conducts rotation processing on the image information based on the rotation standard.

20 Claims, 7 Drawing Sheets

FIG. 4 (A)

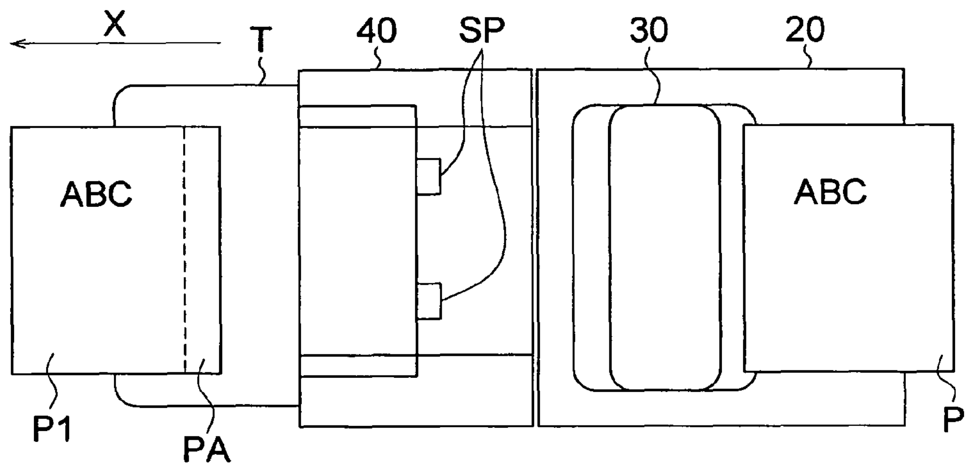

FIG. 4 (B) STANDARD TABLE OF IMAGE ROTATION ANGLE IN POST PROCESSING

| OUTPUT SIDE / INPUT SIDE | STAPLE (1 SPOT ON LEFT) | STAPLE (1 SPOT ON RIGHT) | STAPLE (2 SPOTS ON LEFT) PUNCH (LEFT) | STAPLE (2 SPOTS ON RIGHT) PUNCH (RIGHT) | STAPLE (2 SPOTS ON TOP) PUNCH (TOP) |
|---|---|---|---|---|---|
| UPWARD | 180° | 0° | 180° | 0° | 90° |
| LEFTWARD | 270° | 90° | 270° | 90° | 180° |
| DOWNWARD | 0° | 180° | 0° | 180° | 270° |
| RIGHTWARD | 90° | 270° | 90° | 270° | 0° |

* ROTATION ANGLES IN THE TABLE ARE DEFINED SUCH THAT THE CLOCKWISE DIRECTION IS A POSITIVE DIRECTION

METHOD AND APPARATUS PROVIDING CONSISTENT ROTATION FOR PAGES IN A JOB IN ACCORDANCE WITH POST-PROCESSING REQUIREMENTS

This application is based on Japanese Patent Application No. 2005-206852 filed on Jul. 15, 2005 in Japanese Patent Office, the entire content of which is hereby incorporated by reference.

BACKGROUND OF THE INVENTION

The present invention relates to an image forming system, an image forming method as well as an image forming program, wherein handling of an output medium which is subjected to post processing and of an output medium which is not subjected to post processing, can be improved.

In image forming apparatuses such as copying machines and printers, in recent years, when outputting an output medium on which images are formed based on a series of image information, it is possible to use a post processing apparatus connected to the image forming apparatus and thereby to conduct various post processing such as folding plural output media on which images are formed based on a series of image information, stapling and punching, or sticking (e.g., gluing or fastening together in any way), according to circumstances, to output to an ejection tray, though details are omitted here.

In the case of the post processing apparatuses of this kind, some of them can output media after image forming including output media which have been subjected to post processing and output media which have not been subjected to post processing, both coexisting. For example, in some cases, stapled output to be outputted under the condition to be stapled for each established number of pages due to binding instruction and non-stapled output to be outputted under the condition not to be stapled are outputted on a coexisting basis.

Therefore, for making handling for both stapled output and non-stapled output to be easy, disclosed is a technology to control rotation of the image so that the stapling position may come to the prescribed position when conducting stapling with a post processing apparatus on outputted medium on which images are formed (for example, see Patent Document 1).

Further, for example, disclosed is a technology to aim easy taking-out wherein, when a document is judged to be set in its longitudinal direction, an image is formed in the longitudinal direction as it is, while, when a document is judged to be set in its lateral direction, an image is rotated to form an image in the longitudinal direction to be ejected, whereby, output media are ejected after their orientations for ejection are always kept the same by forming an image on output medium (transfer sheet) in the longitudinal direction constantly, thus, handling for taking-out is improved (for example, see Patent Document 2).

In the Patent Document 1, however, nothing is considered at all with respect to an orientation (an orientation of an image relative to the direction of ejection in the case of ejecting output medium) of an image which is formed based on a series of image information, although a rotation of the image is controlled for making a position of stapling to be the desired position when a post processing apparatus is used which carries out post processing at a fixed predetermined post processing position. In addition, nothing is considered at all for mixing together a stapling output that is to be stapled, as post processing, on an output medium on which an image is formed and a non-stapling output that is not to be stapled (ordinary output), in the same JOB of the image forming apparatus (which means image forming operations for a series of image information), for example. Therefore, no consideration is naturally given at all to the orientation of an image that is formed in the case of making a stapling output and a non-stapling output to coexist in the same JOB.

Further, in the Patent Document 2, no consideration is given to the occasion wherein a stapling output and a non-stapling output coexist in the same JOB, although it is arranged in a way that an image is constantly formed only on a transfer sheet in the longitudinal direction, so that the sheet may be taken out easily.

On the other hand, in the case of conducting post processing, when stapling or punching at a desired position on the output medium, the output medium (transfer sheet) is rotated on the same plane or is turned over to control so that working positions for a stapler and a punch may come to the desired positions, because a stapling device (a stapler) and a punching device (a punch) of a post processing apparatus that conducts stapling and punching are set at prescribed positions, for example.

Since the transfer sheet to be subjected to post processing is rotated, but the transfer sheet to be subjected to no post processing does not need to be rotated, when coexisting transfer sheets are ejected, the orientation of an image formed on a transfer sheet has been changed for ejection depending on whether the post processing is needed or not.

In the past, since a stapling output and a non-stapling output have been set on each JOB unit, even when orientations of images are different each other depending on the case of a stapling output and on the case of a non-stapling output, users have experienced no sense of discomfort, because they have taken out and observed output images on each JOB unit.

However, the present inventors newly found out the problem that, if a stapling output and a non-stapling output are different from each other in terms of an orientation of the outputted image, when making a stapling output and a non-stapling output to coexist in the same JOB as stated above, a user needs to correct the orientations so that orientations of outputted images may be the same, and this is time-consuming and results in poor workability.

(Patent Document 1) TOKUKAIHEI No. 6-255283
(Patent Document 2) TOKUKAI No. 2001-75421

SUMMARY OF THE INVENTION

Based on the background stated above, an object of the present invention is to provide an image forming system, an image forming method and an image forming program wherein the usability is improved for a user in the case of making an output medium for post processing and an output medium for no post processing to coexist in the same JOB.

An embodiment of the invention for achieving the aforesaid object is an image forming system comprising: an image forming section in which an image is formed on an output medium based on image information; a post processing section in which prescribed post processing on the output medium on which an image is formed by the image forming section; a setting section which sets a booklet division mode in which an output medium on which prescribed post processing is to be conducted and an output medium on which prescribed post processing is not to be conducted coexist among the plural output media on which images are to be formed based on a series of image information; and an image processing section which determines a rotation standard for rotating image information so that an orientation of an image which is to be formed on an output medium on which prescribed post processing is not to be conducted agrees with an orientation of an image formed on an output medium on which prescribed post processing is to be conducted, if the booklet division mode is set by the setting section, and which conducts rotation processing on the image information based on the rotation standard.

Another embodiment is an image forming system comprising: an image forming section in which an image is formed on an output medium based on image information; a post processing section in which prescribed post processing on the output medium on which an image is formed by the image forming section; a setting section which sets a booklet division mode in which an output medium on which prescribed post processing is to be conducted and an output medium on which prescribed post processing is not to be conducted coexist among the plural output media on which images are to be formed based on a series of image information; and an image processing section which determines a rotation angle of image information for an image which is to be formed on the output medium on which prescribed post processing is not to be conducted so that an orientation of an image formed on an output medium on which prescribed post processing is not conducted agrees with an orientation of an image formed on an output medium on which prescribed post processing is conducted, if the booklet division mode is set by the setting section, and conducts rotation processing on the image information based on the rotation angle.

Still another embodiment is an image forming method comprising steps of: forming an image on an output medium based on image information; conducting post processing on the output medium on which an image is formed; judging whether or not a booklet division mode is set, in the booklet division mode, an output medium on which prescribed post processing is to be conducted and an output medium on which prescribed post processing is not to be conducted coexist among the plural output media on which images are to be formed based on a series of image information; determining a rotation standard for rotating image information if the booklet division mode is set, so that an orientation of an image which is to be formed on an output medium on which prescribed post processing is not to be conducted agrees with an orientation of an image formed on an output medium on which prescribed post processing is to be conducted, and conducting rotation processing on the image information based on the rotation standard.

Another embodiment is an image forming method comprising steps of: forming an image on an output medium based on image information; conducting post processing on the output medium on which an image is formed; judging whether or not a booklet division mode is set, in the booklet division mode, an output medium on which prescribed post processing is to be conducted and an output medium on which prescribed post processing is not to be conducted coexist among the plural output media on which images are to be formed based on a series of image information; determining a rotation angle of image information for an image which is to be formed on the output medium on which prescribed post processing is not to be conducted so that an orientation of an image formed on an output medium on which prescribed post processing is not conducted agrees with an orientation of an image formed on an output medium on which prescribed post processing is conducted, if the booklet division mode is set, and conducting rotation processing on the image information based on the rotation angle.

Another embodiment is an image forming program to conduct in an image forming apparatus, the program comprising steps of: forming an image on an output medium based on image information; conducting post processing on the output medium on which an image is formed; judging whether or not a booklet division mode is set, in the booklet division mode, an output medium on which prescribed post processing is to be conducted and an output medium on which prescribed post processing is not to be conducted coexist among the plural output media on which images are to be formed based on a series of image information; determining a rotation standard for rotating image information if the booklet division mode is set, so that an orientation of an image which is to be formed on an output medium on which prescribed post processing is not to be conducted agrees with an orientation of an image formed on an output medium on which prescribed post processing is to be conducted, and conducting rotation processing on the image information based on the rotation standard.

Another embodiment is an image forming program to conduct in an image forming apparatus, the program comprising steps of: forming an image on an output medium based on image information; conducting post processing on the output medium on which an image is formed; judging whether or not a booklet division mode is set, in the booklet division mode, an output medium on which prescribed post processing is to be conducted and an output medium on which prescribed post processing is not to be conducted coexist among the plural output media on which images are to be formed based on a series of image information; determining a rotation angle of image information for an image which is to be formed on the output medium on which prescribed post processing is not to be conducted so that an orientation of an image formed on an output medium on which prescribed post processing is not conducted agrees with an orientation of an image formed on an output medium on which prescribed post processing is conducted, if the booklet division mode is set, and conducting rotation processing on the image information based on the rotation angle.

BRIEF DESCRIPTION OF THE DRAWINGS

FIG. 4(A) and FIG. 4(B) are pattern diagrams showing an example of a calculation standard for the rotation angle of an image.

DETAILED DESCRIPTION OF THE PREFERRED EMBODIMENT

Figure 1:
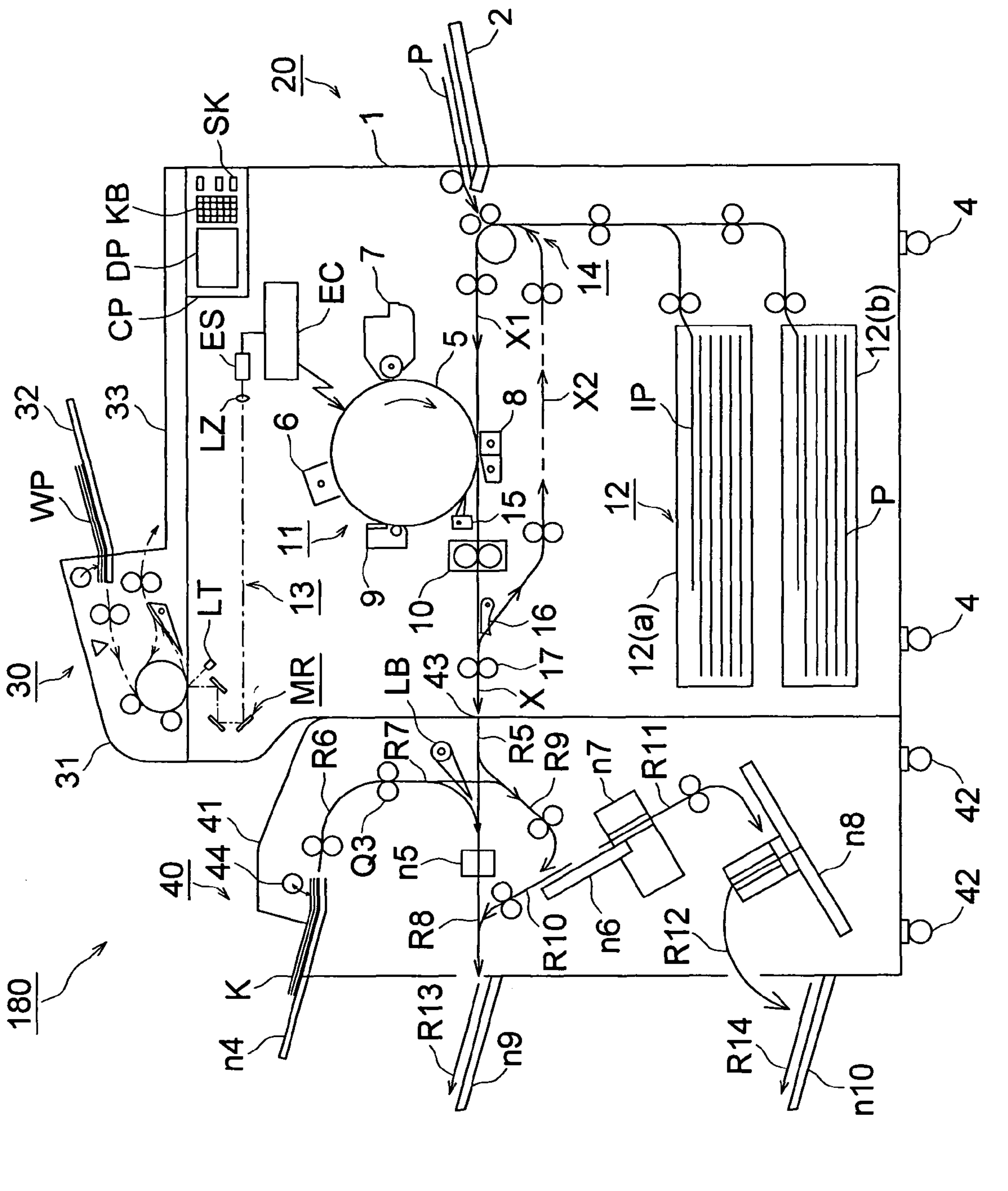
FIG. 1 is a schematic diagram of an image forming system that is equipped with a post processing apparatus.

Hereinafter, the embodiments of the present invention will be explained in detail with reference to the accompanying drawings, though the present invention is not limited to it. Further, in the drawings, the same numerals indicate the same articles and by referring to the other related drawings when necessary, the present invention will be explained in detail.

Figure 2:
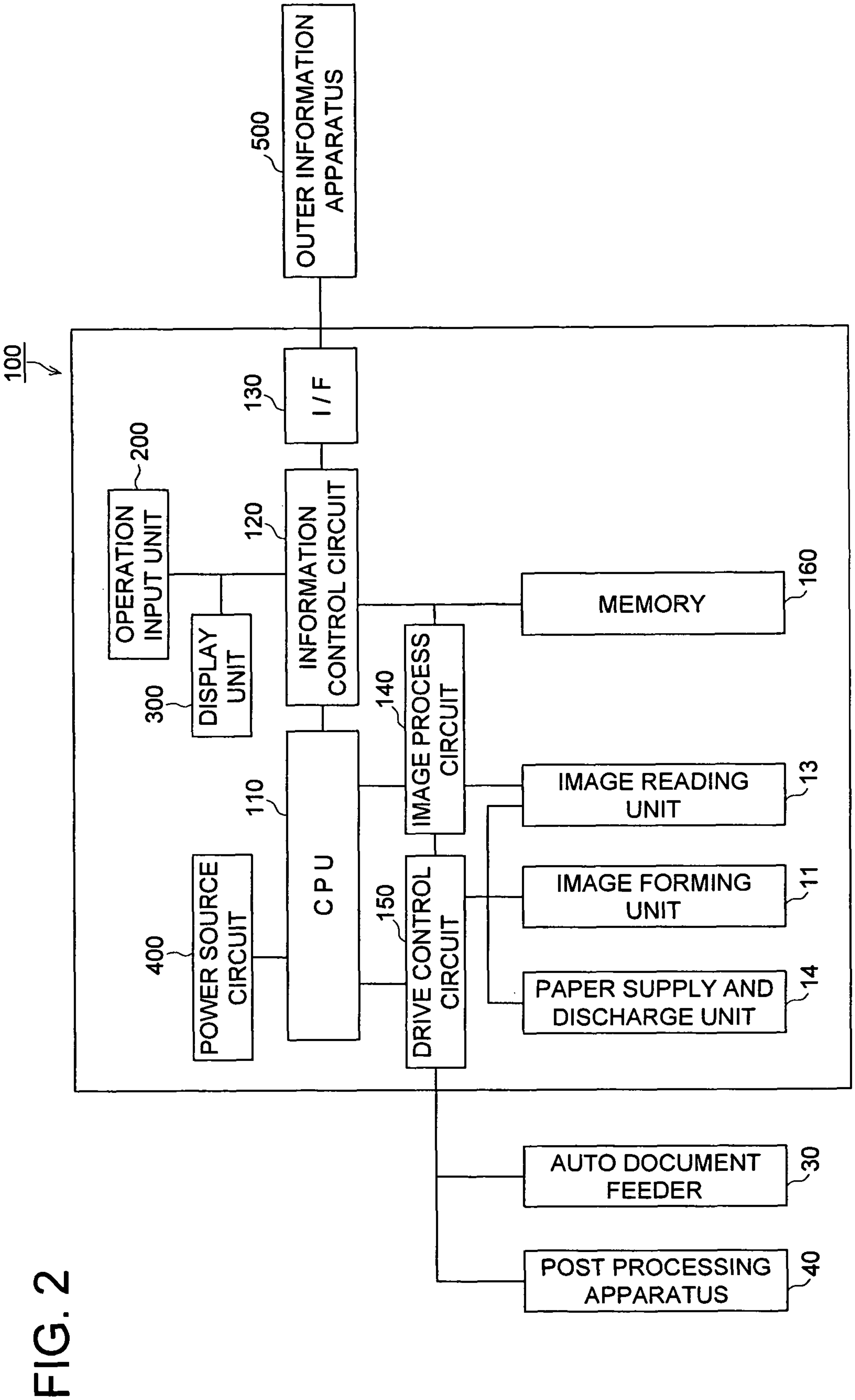
FIG. 2 is a block diagram showing a circuit structure for image forming.
Figure 3:
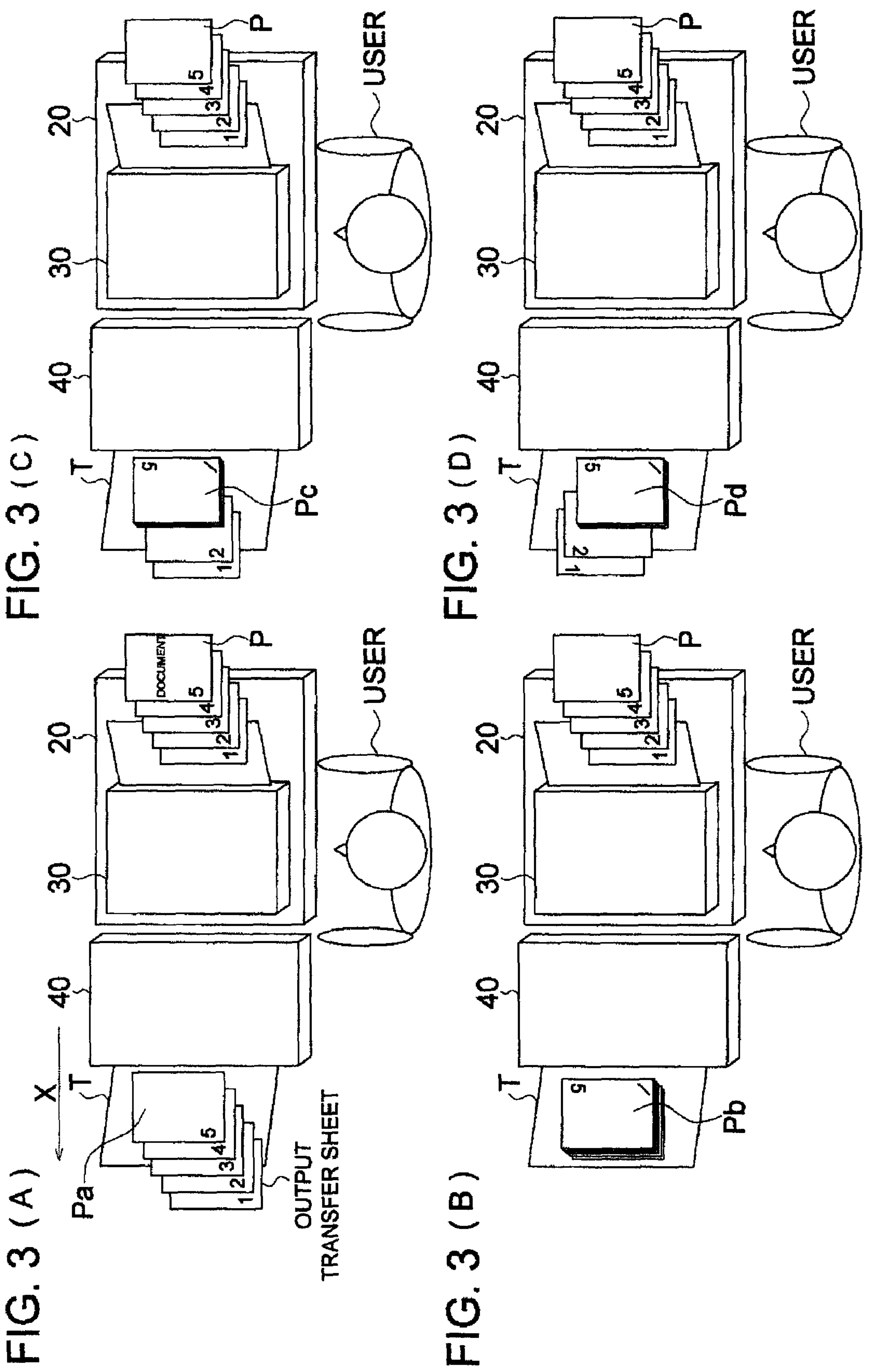
FIG. 3(A) to FIG. 3(D) are pattern diagrams showing examples of how output media are outputted.
Figure 5:
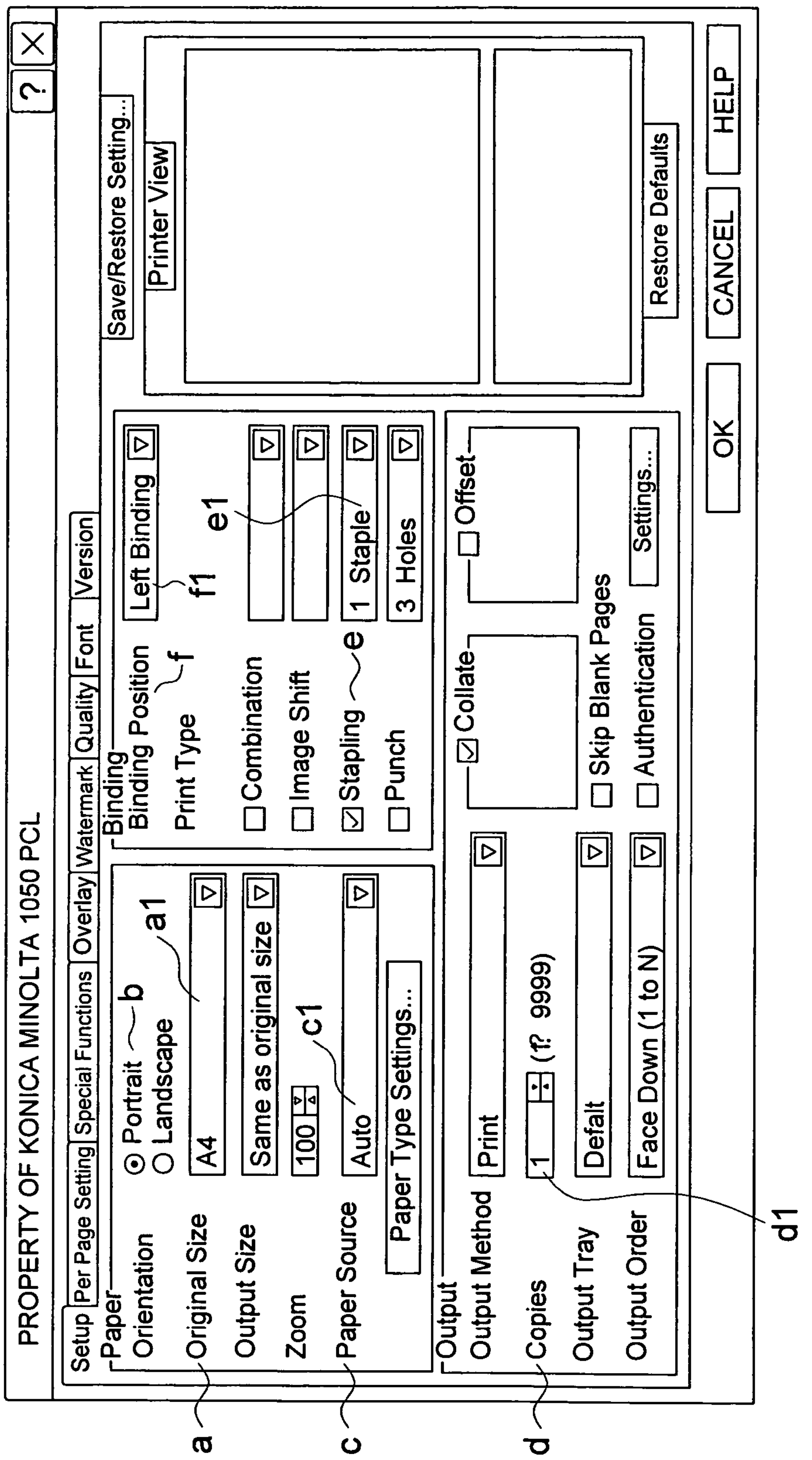
FIG. 5 is a pattern diagram showing an example of a display screen on which post processing is set selectively.
Figure 6:
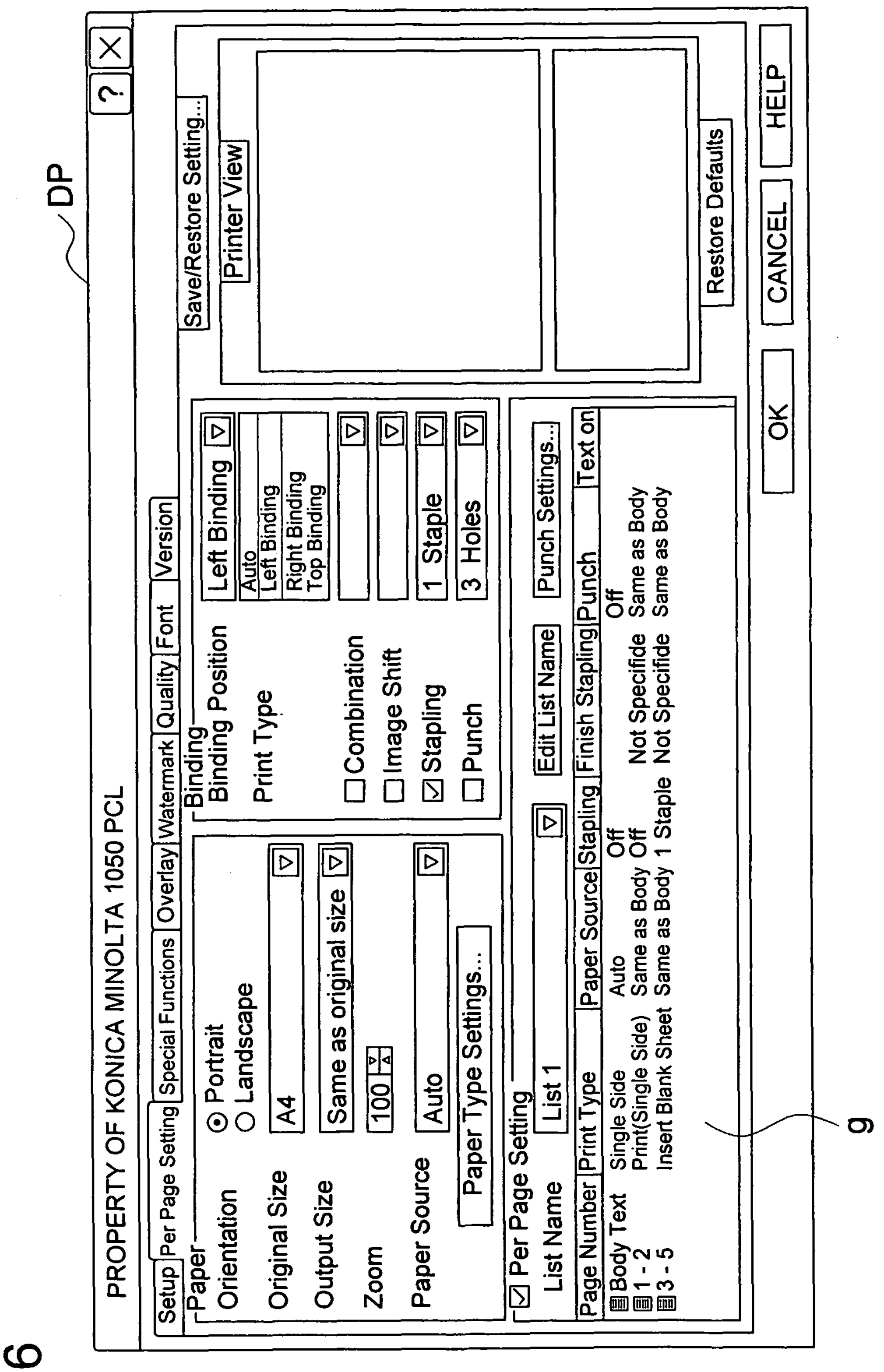
FIG. 6 is a pattern diagram showing an example of a display screen on which detailed conditions for booklet division mode are set selectively.
Figure 7:
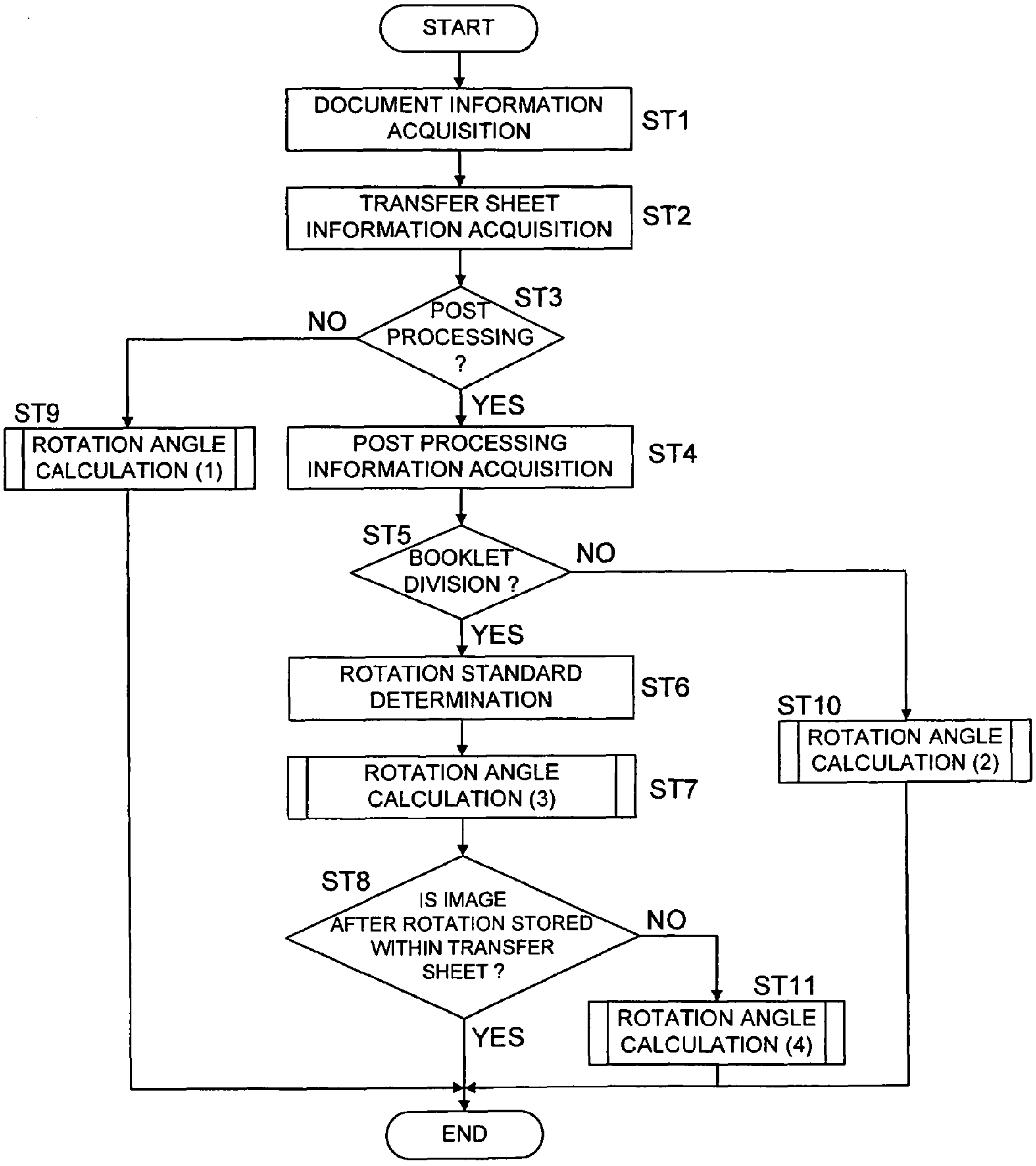
FIG. 7 is a flow chart for illustrating an example of rotation control for an image formed on an output medium.

FIG. 1 is a schematic diagram of image forming system of an embodiment of the invention, FIG. 2 is a block diagram showing a circuit structure of image forming, FIG. 3 is a view showing a frame format of an example of the output condition of an output medium, FIG. 4 is a view showing a frame format of an example of calculation standard for rotation angle of a formed image, FIG. 5 is a view showing a frame format of an example of a display screen for selective setting for post-processing, FIG. 6 a view showing a frame format of an example of a display screen for selective setting for detailed condition of booklet division mode and FIG. 7 is a flow chart explaining an example of rotation control of an image formed on an output medium.

The constitution of image forming system of an embodiment of the present invention will be explained by referring to FIG. 1.

An image forming apparatus 20 of the embodiment of the present invention is assumed as an electrophotographic copier for simplicity of explanation. The electrophotographic copier is well known, so that the parts directly independent of the present invention will be explained simply.

The numeral 20 represents an image forming apparatus, 30 represents an automatic document feeder (ADF) installed on the image forming apparatus 20, and numeral 40 represents a post processing apparatus equipped with post processing functions to conduct, on an output medium, processing such as, for example, insertion (addition) of a cover sheet, punching a hole in an output medium, stapling and folding, all for a transfer sheet on which an image is recorded (or formed).

In the present embodiment, in particular, it is arranged to be capable of practicing a booklet division mode wherein output media to be subjected to post processing and output media to be subjected to no post processing coexist to be ejected, by ejecting an output medium on which an image is formed without post processing and by ejecting a booklet after binding (or stapling) a bundle of output media of prescribed pages as post processing, for example, when forming images on output media based on a series of image information, which will be described in detail, later.

In the image forming apparatus 20, on the right side of a housing 1, a manual supply tray 2 for feeding a comparatively small amount of transfer sheets P which are output media is installed. Further, on the left side, it is structured to convey a transfer sheet P which is formed with an image toward post processing apparatus 40. And, at the bottom of the housing 1, a plurality of casters 4 for moving the image forming apparatus 20 are installed.

Transfer sheet P is roughly divided into normal transfer sheet P and special transfer sheet IP. The normal transfer sheet P is called standard paper or plain paper and as a special transfer sheet, thicker paper (thick sheet), thinner paper (thin sheet), index sheet or OHP sheet with projection called tab, or reused sheet of normal transfer sheet P, on the one side of which an image has been printed is used.

On the upper part of the front of the housing 1, a control panel CP as a display unit 300 and an operation input unit 200 for operating the image forming apparatus 20 is installed.

On the control panel CP, a display unit DP made up of a liquid crystal display device or a touch panel type liquid crystal display device in which a touch panel is incorporated and an input device made up of a keyboard KB and a start button (may be referred to as a copy button) SK are installed.

In display unit DP of a touch panel type, when a user touches a pattern of a button on which a figure, a character and a symbol shown on a display unit are drawn, the user can input selection or setting of information shown on the display unit, which means that the display unit DP works as also an input unit for the item that requires selection and setting for the operation mode in addition, in many cases.

For example, on control panel CP, it is possible to conduct selection and setting of the operation mode including selection from color, and black and white for a print (or a copy) concerning a transfer sheet to be outputted, selection from two-sided printing and single-sided printing and selection of whether post processing is to be conducted or not, selection and setting of detailed post processing conditions including the type of post processing when the post processing is practiced, and selection, inputting and setting of various image forming conditions including the type and a size of a transfer sheet to be used, the number of prints or the number of sets of prints to be outputted, enlargement and reduction and setting of density.

In particular, in the present embodiment, when forming an image on a transfer sheet based on a series of image information (which is also called JOB simply), it is possible to select, set and practice a booklet division mode wherein a transfer sheet to be subjected to post processing and a transfer sheet to be subjected to no post processing coexist to be ejected.

In other words, in the booklet division mode, a transfer sheet to be subjected to post processing and a transfer sheet to be subjected to no post processing can be made to coexist in one JOB. Meanwhile, in the booklet division mode, an orientation of an image formed on a transfer sheet to be subjected to post processing and an orientation of an image formed on a transfer sheet to be subjected to no post processing are controlled to be equalized, as described later. In this case, the post processing means processing to be conducted on the transfer sheet, and stapling, punching, folding and book binding by means of adhesion, for example, are included in the post processing. When the post processing is processing which can be conducted only under the condition of a prescribed position or direction, for the reason such as a restriction for the position of a unit to conduct post processing in the apparatus, in particular, an effect of application of the present embodiment is great.

Further, key board KB representing an input device as operation input unit 200 is used when inputting mainly numerical values, and start button SK (which is also called a copy button) is used when starting operations of JOB such as copying of image forming apparatus 20, thus, operations of ADF 30 and of post processing apparatus 40 can be started on a close cooperation basis. In other words, they are used when starting practice of a series of image forming operations, as an image forming system including image forming apparatus 20, ADF 30 or post processing apparatus 40.

Inside the housing 1, a control unit EC, an image forming unit 11, an image reading unit 13, and a paper supply and discharge unit 14 are installed.

The control unit EC is called a control circuit, which is a control unit for controlling all the operations of the image forming apparatus 20 and is made up of an electric circuit including a CPU. And, the control unit EC, on the basis of the control program and control data stored in the CPU beforehand, drives and controls all the units making up of the image forming apparatus 20.

Further, when ancillary devices such as an ADF 30 or post processing apparatus 40 are connected to the image forming apparatus 20, the control unit EC functions as a control device, similarly in conjunction with the ancillary devices, to drive and control the image forming apparatus 20 so as to smoothly operate it all as a system.

Furthermore, even when the apparatus is connected to a personal computer or other information devices by a LAN (local area network), the control unit EC, in conjunction with these devices, can drive and control smoothly the image forming apparatus 20 including storing and transferring of information necessary for the operation.

The image forming unit 11 is a unit for forming an image on the basis of image information such as document. For example, the image forming apparatus 20 is made up of a photoreceptor drum (may be referred to as a photoconductor or image carrier) 5 rotating in the preset imaging direction (for example, the clockwise direction indicated by the arrow) by a drive source such as a motor, a charging unit 6 for uniformly charging the photoreceptor drum 5, an exposing unit (not drawn) for emitting an exposure light beam on the basis of image information (may be referred to as image data) of a document to form an electrostatic latent image on the photoreceptor drum 5, a developing unit 7 for visualizing the electrostatic latent image formed on the photoreceptor drum 5 as a toner image, a transfer-separation unit 8 for transferring the toner image formed on the photoreceptor drum 5 to the transfer sheet P, a cleaning unit 9 for scraping off toner and paper powder remaining on the photoreceptor drum 5 after the toner image is transferred to the transfer sheet P, and a fixing unit 10 for melting and fixing the transferred toner image to the transfer sheet P.

Incidentally, in the present embodiment, there has been explained an occasion wherein image forming unit 11 has one photoreceptor drum 5, for simplifying the explanation. However, it is naturally possible to use an image forming unit of a tandem type, for example, in which a plurality of the aforesaid photoreceptor drums 5 are used, and toner images respectively for Y (yellow), M (magenta), C (cyan) and K (black) are formed on a transfer belt representing an intermediate transfer body, for example, to be transferred collectively onto a transfer sheet.

In some transfer sheets, a core set (which is also called a curl) is easily caused, and when a transfer sheet is separated from the photoreceptor drum, the transfer sheet becomes difficult, in some cases, to be separated, depending on the state of the curl, and it keeps winding itself round the photoreceptor drum 5 to cause a trouble. In order to prevent this, in the present embodiment, separation claw device (separating device) 15 having a separation claw capable of coming into contact with or retreating from the photoreceptor drum 5 is provided as a device to support operations of transfer separation unit 8 that separates a transfer sheet from the photoreceptor drum 5.

The image reading unit 13 is made up of a reading optical system including a light source LT, mirrors MR, and an imaging lens LZ and a reader ES equipped with an electric circuit including a CCD (solid imaging device).

The reader ES, when the image forming apparatus 20 is a copier, is positioned bottom side of automatic document feeder 30 and reads image information of a document loaded on a platen glass (not drawn) installed on the upper part of the housing 1 and makes a document conveyed to the reading position by the automatic document reader 30, converts it to digital image data, and stores the image data in a memory installed in the control unit EC after compression of data for example.

Further, when reading the document conveyed by the ADF 30 by the image reading unit 13, the light source LT irradiates the document conveyed to the reading position, and the reflected light from the document is focused on the CCD surface of the reader ES by the imaging lens Lz via the mirrors MR, and the image information outputted by the CCD is stored as image data in the memory.

The paper supply and discharge unit 14 is made up of a paper feed cassette 12 and a paper discharge and conveying device including a motor as a drive source, a plurality of rollers, guide member for guiding through conveyance direction and a lever for switching conveyance directions and the like.

The paper feed cassette 12 is made up of a cassette 12*a* for storing special transfer sheets IP and a cassette 12*b* for storing ordinary paper P.

A sheet-feeding-ejecting conveyance unit is composed, for example, of a straight-ahead conveyance unit and a cyclic conveyance unit, and the straight-ahead conveyance unit has a straight-ahead conveyance path that can form an image on one side of the transfer sheet conveyed from paper feeding cassette 12 with image forming unit 11, and can eject it.

The cyclic conveyance unit has a cyclic conveyance path through which a conveyance direction is reversed on the half way of conveyance of a transfer sheet on which an image is formed on its one side (which is also called a right side) in the sheet-ejection direction, then, the transfer sheet is reversed inside out, and it is conveyed so that an image may be formed on the other side (which is also called a reverse side) of the transfer sheet, for forming images on the right side and the reverse side of the transfer sheet.

Selection among the straight-ahead conveyance unit and the cyclic conveyance unit for operation is controlled by judgment performed by control unit EC from print side information (which is also called the print mode) for single-sided print or two-sided print inputted and established by operation input unit 200.

When conveying a transfer sheet, a cyclic conveyance control unit causes a sheet-feeding-ejecting conveyance unit to operate following instructions of control unit EC, and in the case of a single-sided printing mode to form an image on one side, for example, a motor representing a driving source is driven after selecting and setting specific transfer sheet IP or plain paper P in advance, to rotate plural roller groups, whereby, the specific transfer sheet IP or plain paper P selected in advance is fed and conveyed from sheet-feeding cassette 12 toward photoreceptor drum 5 at appropriate timing, to be conveyed for ejection, after an image based on a document is formed.

Further, in the case of a two-sided mode to conduct so-called two-sided printing (which is also called front-back two sides printing) where images are formed on both sides, a cyclic conveyance control unit causes a sheet-feeding-ejecting conveyance unit to operate following an instruction of control unit EC, rotation of reversing roller 17 is stopped on the half way of conveyance of the transfer sheet on which an image is formed on its one side by image forming unit 11, in the sheet-ejection direction (direction of arrow X), for example, at a point in time when the leading edge of the transfer sheet has passed through the reversing roller 17, and the direction of rotation of the reversing roller 17 is switched.

Simultaneously, reversing member 16 is rotated clockwise to change the traveling direction of the transfer sheet which is being conveyed toward image forming unit 11 into the path shown by arrow X2 (which is also called a cyclic conveyance path).

Then, after temporarily making the transfer sheet be on standby by conveying it through the inside of the cyclic conveyance path based on the number of sheets of cyclic conveyable established in advance, the transfer sheet is conveyed from the direction of arrow X2 to X1 direction at appropriated timing, to make the image forming unit 11 form an image again, thus, the transfer sheet printed on its both sides is ejected in the X direction to be conveyed to post processing apparatus 40.

Meanwhile, though a guide member for conveying a transfer sheet properly is provided in the conveyance path, for a transfer sheet in many cases generally, illustration and explanation for such guide member are omitted to simplify the explanation in the present embodiment of this invention.

The automatic document feeder (ADF) will be briefly explained.

The conveying unit of the ADF 30 is entirely enclosed in the ADF housing 31, and the document platen 32 and the paper discharge unit 33 are located outside the ADF housing 31.

On the document platen 32, for example, plural documents WP are placed with the first page located at the top and the document side (surface) up. The documents WP are conveyed by the document conveying unit including plural rollers to the reading position, read by the reading unit ES, and then discharged onto the paper discharge unit 33.

The document conveying unit is designed to operate in conjunction with the controller EC of the image forming apparatus 20 by means of the drive control circuit (not shown).

A structure of the post processing apparatus 40 will briefly be explained as follows.

The whole of the post processing apparatus 40 is covered by casing 41, and on the right side of the casing 41 (image forming apparatus 20 side), provided is loading slot 43 that accepts a transfer sheet having an image thereon ejected from the image forming apparatus 20, and on the left side thereof, provided are cover sheet feeding section n4 on which cover sheets K before feeding are placed, sheet-ejection tray (stacking section) n9 on which bound transfer sheet bundles are stacked and sheet-ejection tray n10 that accepts a folded transfer sheet bundle. Further, on the bottom surface of the casing 41, there are provided a plurality of rollers 42 with which the post processing apparatus 40 can be moved.

Inside the casing 41, there are provided a driving source such as a drive control circuit and a motor (not illustrated) that operates by interlocking with control unit EC of the image forming apparatus 20. There are further provided a shift-processing section and hole punching section (which is also called a punching section) n5, intermediate stacker (stacking section) n6, stapler (stapling device) n7, and folding device n8, and further, conveyance paths R5, R6, R7, R8, R9, R10, R11, R12, R13 and R14 are constituted.

The conveyance paths R1-R11 are mainly formed by a conveyance device for post processing wherein a plurality of paired conveyance rollers, each being composed of a driving roller and a follower roller, are arranged, and for example, provided are pickup roller 44, that takes out cover sheet K, sheet by sheet, along conveyance path R6 and pre-feed stop position Q3 composed of paired conveyance rollers that can stop temporarily the conveyance of the cover sheet K taken out to make it to be in standby state.

There is further provided a conveyance, path changing unit composed of rotatable guide LB that is for changing conveyance paths from conveyance path R5 to R8 or to R9, or from conveyance path R7 to R8 or to R9.

Further, a sheet that is made of the material such as paper or resin film is generally used for the cover sheet K that is used as a cover, and under some circumstances, a sheet made of specific material or subjected to specific processing, namely, for example, a sheet made of wood, leather or metal foil, is sometimes used.

Now, operations of the post processing apparatus 40 will be briefly explained.

For simplifying an explanation, let it be assumed that a cover sheet is inserted as a cover, and it is understood in advance that cover sheet K is inserted as a cover. Further, it is assumed that these preconditions are established in advance by operation input unit 200 of the image forming apparatus 20.

When inserting the cover sheet K, a conveyance device for the post processing is operated through the drive control circuit of the post processing apparatus 40 that operates interlocking with image forming apparatus 20, whereby, cover sheet K placed on cover sheet feeding unit n4 is taken up by pickup roller 44 one by one to be conveyed along conveyance path R6, and it stops at the position where its leading edge arrives at pre-feed stop position Q3.

In synchronizing with timing for the transfer sheet having thereon an image formed to be ejected from image forming apparatus 20, based on information from the image forming apparatus 20, the conveyance device for the post processing is started again, whereby, the cover sheet K, which was stopped at pre-feed stop position Q3 to be in a standby state, is fed out (conveyed again) to advance along the conveyance path R7.

When stapling or folding is not carried out, the transfer sheet is conveyed from the conveyance path R7 to R8 and to R13 to be ejected to sheet-ejection tray n9, because guide LB is stopped at the illustrated position. Successively, the transfer sheet having thereon an image formed advances to conveyance path R5 through loading slot 43, and then, is conveyed to R13 from R8 to be ejected to sheet-ejection tray n9, thus, a bundle of transfer sheets with a cover is formed.

When stapling or folding is carried out, cover sheet K is fed out from the pre-feed stop position Q3 and is further conveyed from conveyance path R7 along conveyance path R9 to be ejected onto intermediate stacker n6, because guide LB is stopped after rotating counterclockwise from the illustrated position.

When the transfer sheet having thereon an image formed advances to conveyance path R5 through loading slot 43, in the same way, the transfer sheet cannot be conveyed to conveyance path R8, and its course is changed to R9 because guide LB stops after rotation of counter-clockwise from the illustrated position. Then, the transfer sheet conveyed along conveyance path R9 is ejected onto intermediate stacker n6. In this case, on said intermediate stacker n6, the cover sheet K, ejected previously and the succeeding transfer sheet, are aligned, and thereby, a transfer sheet bundle with a cover is formed.

When stapling is carried out, cover sheet K and transfer sheets are stapled together by stapler n7, and then, they are conveyed from conveyance path R10 to R13 to be ejected onto sheet-ejection tray n9, whereby, a stapled transfer sheets bundle with a cover sheet is formed.

When stapling and folding are carried out, cover sheet K and transfer sheets are stapled together by stapler n7, and then, they are conveyed along conveyance path R11, and are folded together by folding device n8 to be conveyed to R14 from conveyance path R12, and are ejected to sheet-ejection tray n1, thus, a stapled and folded transfer sheet bundle with a cover sheet is formed.

When sorting is carried out, cover sheet K is stopped temporarily at shift-processing unit n5 provided at the half way point of conveyance path R8, and at this position, a succeeding transfer sheet is stacked. After that, the cover sheet K and the transfer sheet can move together in the vertical direction which is perpendicular to the conveyance direction and is in parallel with a sheet surface, and the cover sheet K can be conveyed to each step of the sheet-ejection tray n9 by interlocked operations between the shift-processing unit n5 and the sheet-ejection tray n9, because the sheet-ejection tray n9 is constituted to be of plural steps, which is not illustrated.

When only folding is carried out, the cover sheet K and the transfer sheet both ejected to the intermediate stacker n6 and stacked thereon are trued up on the intermediate stacker n6, and are conveyed to folding device n8 along conveyance path R11 to be folded by the folding device n8, and are conveyed from conveyance path R12 along R3 to be ejected to sheet-ejection tray n10. Incidentally, it is also possible to arrange so that the ejection may be made from the folding device n8 to the sheet-ejection tray n9.

The image forming system 180 will be explained next referring to FIG. 2.

Reference number 100 shows the configuration of various units and circuits of the image forming apparatus 20, numeral 110 denotes the CPU that controls the entire image forming apparatus and has stored various programs for controlling the image forming apparatus 20 and data required for executing the programs.

The CPU 110 is connected to an information control circuit 120, an image process circuit 140, a drive control circuit 150 and power source circuit 400. And those circuits and the CPU 110 constitute a control unit EC shown in FIG. 1 thereby controlling the entire image forming system including image forming apparatus 20 in conjunction with automatic document feeder 30 and post processing apparatus 40 to be described later.

The information control circuit 120 is connected to an outer information apparatus 500 via an interface (I/F) 130 according to the instructions by the CPU 110. And image information, such as text and images, and preset information necessary for forming images, such as density and magnification, are inputted as JOB information for each JOB as a printing unit and stored in the memory 160. Then, preset information stored in the memory 160 is outputted to the image process circuit 140, drive control circuit 150, or display unit 300.

In the present embodiment, information control circuit 120 judges, through operation input unit 200, whether a post processing mode for conducting post processing is selected or not, and when the post processing mode is selected, the information control circuit 120 inputs, in CPU 110, that a mode is the post processing mode. Then, the CPU 110 practices a program established in advance for operating the post processing apparatus through drive control circuit 150, so that operations corresponding to the selected post processing may be conducted, which will be described in detail later.

Further, when the post processing mode is selected and a booklet division mode is further selected, the information control circuit 120 inputs, in CPU 110, that a booklet division mode is selected, in the same way, and the CPU 110 operates image process circuit 140, and practices a program established in advance to conduct image processing for conducting rotation of image information, for rotating an orientation of an image on the transfer sheet for no post processing based on a standard of an orientation of an image on the transfer sheet for post processing, for example.

In particular, in the present embodiment, orientations of images are equalized based on the standard of the transfer sheet for post processing so that an orientation of an image formed on the transfer sheet for post processing may agree with that of an image formed on the transfer sheet for no post processing, under the condition of the booklet division mode. Therefore, an orientation of an image formed on the transfer sheet for no post processing is rotated, and for example, a size of a document and an orientation of an image of the document, or a size of the transfer sheet which are necessary for rotation processing of image information (image data) conducted for rotation of the image are acquired and stored in memory 160.

When practicing copying functions, if a post processing mode is selected by liquid crystal display device DP of a touch panel type, information control circuit 120 reads out a post processing mode stored in memory 160 in advance, and sets up various units and circuits, such as image forming apparatus 20 and post processing apparatus 40, so that the post processing mode may be practiced, and when practicing printer functions, information control circuit 120 sets up various units and circuits in the same way so that a post processing mode inputted from outer information apparatus 500 through interface (I/F) 130 may be practiced.

Further, the information control circuit 120 has functions to input and output directive information concerning data associated with JOB information (which is also called JOM data) in addition to JOB information inputted from outer information apparatus 500, for example, that is, detailed control for operating various circuits including-image process circuit 140 and drive control circuit 150 and various units, and to transmit automatically various types of information relating to a kind of a transfer sheet inputted by operation input unit 200, and to the image forming mode to respective circuits of an image forming apparatus and to various units properly and smoothly, so that operations of the image forming apparatus may not be adversely affected.

The information control circuit 120 further has a function to judge various types of information outputted from sensors provided on a wide variety of circuits and units, and to support so that CPU 110 may give appropriate instructions.

Moreover, the outer information apparatus 500 is mainly a computer or an Internet server, however, in some cases, it could be another image forming apparatus on the local area network (LAN) or an information apparatus such as a digital camera and a measuring apparatus that can output the measured information.

The interface (I/F) 130 is an information sending and receiving unit, and is configured such that it can be connected to an outer information apparatus 500 including the previously mentioned computer, another image forming apparatus, and an Internet server via a variety of networks.

The operation input unit 200 is an input unit located on the control panel CP of the image forming apparatus 20 such as keyboard KB, and a start button SK. It could be composed of a liquid crystal display unit DP of the touch panel type also working as a display device.

For example, when start button SK is pressed, conveyance of a document placed on ADF 30 is started and copy operations are started, and when a post processing mode has been established, post processing apparatus 40 is also interlocked to operate.

Further, by operating key board KB, it is possible to input information of setting such as the number and types of transfer sheets to be outputted (for example, index paper, thick paper, plain paper, thin paper, recycled paper, OHP sheet and reused paper), or magnification for enlargement and reduction and density of outputted image, and thereby to set various operation modes for image forming apparatus 20 by using liquid crystal display device DP.

With respect to an image forming mode, there are four modes including, for example, (1) a single-sided print is outputted from a single-side printed document, (2) a double-sided print is outputted from a single-side printed document, (3) a single-sided print is outputted from a double-side printed document and (4) a double-sided print is outputted from a double-side printed document, and each of them is button-displayed on liquid crystal display device DP so that establishment may be made selectively.

In the present embodiment, it is possible to set post processing conditions for the post processing apparatus 40, in particular, by the use of display device DP of a touch panel type capable of operating for both display and input, and for example, it is possible to set a post processing mode such as cover sheet insertion and stapling, folding and sorting, the number of pages as a position to insert in the case of a cover sheet insertion mode, and to set various conditions like the type of cover sheet, such as for the front, for the back, or a cover sheet for the both sides when it is bent to cover both faces or a cover sheet for intermediate insertion, as cover sheet insertion conditions.

In the present embodiment, in particular, provided is a booklet division mode capable of outputting a transfer sheet to be subjected to post processing and a transfer sheet not to be subjected to post processing on a coexisting basis, which makes it possible to set detailed conditions such as what type of post processing should be carried out by display device DP of a touch panel type under the booklet division mode.

The display unit 300 displays operation procedures and the lists of various information for entering aforementioned various kinds of information by means of the operation input unit 200, or displays information stored in the memory 160, or displays conditions and warning messages when the entire image forming system surrounding the image forming apparatus 20 is in operation.

As described above, the operational input unit is also used as the display unit by means of operational input unit 200 of touch panel system display device DP.

According to the instructions of the CPU 110, the image process circuit 140, for example, converts image information of the document that has been read by the image reading unit 13 into digital data, and compresses and stores the data as image data in the memory 160, and extends and converts the image data stored in the memory 160 into data and signals that correspond to the image forming method of the image forming unit 11 when the image forming unit 11 forms images.

In the present embodiment, in particular, under the booklet division mode wherein a transfer sheet to be subjected to post processing and a transfer sheet to be subjected to no post processing coexist as in the case where sheets for the text are stapled and sheets for reference data are not stapled, for example, there is practiced a program to conduct image processing wherein an instruction of information control circuit 120 establishes a standard for rotating an image formed on a transfer sheet one sheet by one sheet for equalizing orientations of images formed on a transfer sheet to be subjected to post processing and on a transfer sheet not to be subjected to post processing, and rotates image information (image data) concerning an image formed on a transfer sheet based on the standard.

Meanwhile, in the present embodiment, depending on a type of post processing and on the position for conducting the post processing on a transfer sheet, the state of rotation in the case of conducting the post processing is changed variously by the restriction of the position of installation for the device that conducts the post processing. Therefore, the state of rotation is also changed variously in the same way, even when outputting from the post processing apparatus. Accordingly, an image formed on a transfer sheet that is subjected to no post processing is rotated based on the standard for rotating an image represented by an orientation of an image formed on a transfer sheet subjected to post processing.

According to the instructions of the CPU 110, the drive control circuit 150 operates the image forming unit 11, image reading unit 13, paper supply and discharge unit 14, the ADF 30 and post processing apparatus 40 at the best timing according to the preset operation mode, thereby conducting an image forming operation.

The memory 160 stores JOB information and JOB data, such as image data necessary for forming images, preset conditions for controlling the image forming apparatus 20, and information about various setting mode programs for the image forming apparatus 20 to execute.

JOB information and JOB data are defined as follows in an embodiment of the present invention.

Moreover, JOB information is information about an individual job (JOB). For example, when the image forming apparatus 20 is a copier, JOB information includes the document setting according to document image information, selection of either the one-side mode or double-side mode, selection of the paper feed cassette, selection of the number of copies, and selection of printing density. That is, JOB information is a series of image data determined by making output settings and instructing the copy operation to begin. An image data group that corresponds to such one piece of printing instruction (also referred to as one printing unit) is called one JOB.

Furthermore, in the same manner, when image forming apparatus is, for example, a printer, a series of print data groups sent by the outer information apparatus 500 is called JOB information, and a print data group that corresponds to one piece of printing instruction is called one JOB. And, handling JOB information and JOB data for each JOB is called one JOB unit.

Moreover, JOB data is, for example, setting of conveying speed according to the transfer sheet or detailed data of control value that is related to control items for executing image forming operations, that accompanies JOB information.

Therefore, the memory 160 stores JOB information and JOB data for each JOB, that is, for one JOB unit (simply, referred to as JOB unit).

The image forming unit 11 is composed of, as shown in FIG. 1, a photoreceptor drum 5, an electrification unit 6, a developing unit 7, a transfer and separation unit 8, a cleaning unit 9, a fixing unit 10, and separation claw 15 and is operated by the drive control circuit 150.

Therefore, the image forming unit 11 is controlled based on the image data that has been read by the image reading unit 13 and stored by the memory 160 as well as JOB information and JOB data, and a toner image is formed on the photoreceptor drum 5, and the toner image is transferred onto a normal paper sheet P or reused sheet IP, and then thereby being recorded.

The image reading unit 13 has, as shown in FIG. 1, an optical reading system and a reading unit ES, and is operated by the drive control circuit 150. Image information of the document that has been conveyed to the reading position is read by the reading unit ES, and the read image information is, for example, converted into digital image data by the image process circuit 140, and then compressed and stored in the memory 160.

As shown above, the paper supply and discharge unit 14 is composed of a paper feed cassette 12, a feed-discharge-conveying unit, a cyclic conveyance control unit and cyclic-conveyable number setting unit.

As shown in FIG. 1, the automatic document feeder (ADF) 30 automatically conveys documents placed on the document platen 32 one by one by means of the document conveying unit to the reading position. It operates in conjunction with the drive control circuit 150 according to the instructions of the CPU 110 of the image forming apparatus 20.

The post processing apparatus 40 operates post-processing conveyance device through drive control circuit 150 of post processing apparatus 40 in conjunction with the drive control circuit 150 by the instruction of CPU 110 and the apparatus operates according to a program in which insertion of cover sheet, stapling, folding, sorting or the like is previously set or post-processing condition set at operation input unit 200.

When the power switch (not shown) is turned on by a user, the power source circuit 400 properly supplies electricity from the power source to the entire image forming apparatus, and when the power switch is turned off, it stops the supply of electricity.

Moreover, even when the power switch is turned on, for example, if the energy saving mode has been selected to set the image forming apparatus in the standby mode, the CPU 110 instructs to keep supplying only electricity necessary for temporarily storing memory contents, and blocks the supply of electricity to the fixing unit's heater and the like.

Now, a rotation of an image formed on a transfer sheet in the present embodiment will be explained as follows, referring to FIG. 3(A) to FIG. 3(D).

FIG. 3(A) to FIG. 3(D) is schematic diagrams viewing transfer sheets (Pa, Pb, Pc and Pd) from an upper part, wherein five documents P are conveyed by ADF 30, image on the document P is read by image forming apparatus 20 as image information, images are formed, based on the image information (image data), on five transfer sheets which are conveyed in the direction of arrow X, and are outputted on sheet-ejection tray T through post processing apparatus 40.

Meanwhile, in the present embodiment, figures of 1-5 given to documents P and transfer sheets (Pa, Pb, Pc and Pd) in FIG. 3(A) to FIG. 3(D) indicate numbers of pages and the orientation of images formed on transfer sheets. In other words, the orientation in which a figure is correctly described is upward.

FIG. 3(A) shows the state wherein transfer sheets are outputted (ejected) without conducting post processing after forming images on five transfer sheets Pa based on image data of five documents P, and for example, it shows the state wherein an orientation of an image on document P is the same as that of the image on transfer sheet Pa for outputting.

In this case, it is not necessary to equalize orientations of images formed on the transfer sheets, when or after taking out transfer sheets from sheet-ejection tray T of the post processing apparatus, because all orientations of images formed on transfer sheets Pa to be outputted are in the same direction (upward on a page of the drawing).

FIG. 3(B) shows the state wherein stapling processing on one spot at an upper portion on the left was conducted equally for all pages, as post processing after forming images on transfer sheets Pb for image data of document P, and there is shown the state wherein orientations of images on transfer sheets Pb outputted as a booklet after being stapled are rotated 180° (downward) from the orientation (upward) of images on documents P, depending on arrangement of the stapling device.

In this case, though orientations of the images on transfer sheets Pb to be outputted are rotated by 180°, it is not necessary to equalize orientations of images formed on transfer sheets when or after taking out transfer sheets from sheet-ejection tray T of the post processing apparatus, because all orientations of images formed on transfer sheets Pb to be outputted are in the same direction.

FIG. 3(C) shows the situation of the booklet division mode wherein page 1 and page 2 are outputted without conducting post processing after forming an image on the transfer sheet based on image data of document P, and page 3-page 5 are outputted as a booklet after conducting stapling processing, and FIG. 3(C) also shows the state wherein orientations of images on page 1 and page 2 of transfer sheets Pc to be outputted are the same as that of the image on document P, but, orientations of images for page 3-page 5, to be outputted as a booklet, are rotated by 180° from the orientation of the image on document P.

In this case, orientations of images formed on page 1 and page 2 of transfer sheets not to be subjected to post processing are relatively different from those of images on page 3-page 5 of transfer sheets Pc to be outputted as a booklet after being subjected to post processing. Therefore, when taking out, or after taking out transfer sheets Pc from sheet-ejection tray T of the post processing apparatus, either transfer sheets of page 1 and page 2, which are not subjected to post processing, or transfer sheets Pc of page 3-page 5 which are subjected to post processing and are stapled to be outputted as a booklet, need to be rotated so that orientations of images formed on transfer sheets may be equalized.

Therefore, in the situation shown in FIG. 3(C), operating efficiency is low because of operations by a user to equalize orientations of images on transfer sheets outputted from the post processing apparatus, and further, in operations by a user to equalize orientations of images, erroneous operations are caused, including forgetting to rotate an orientation of an image, which requires further check, thus, operations are complicated to be less reliable, and operating efficiency is further low. The present embodiment is one to improve that transfer sheets are ejected under the situation shown in FIG. 3(C).

FIG. 3(D) shows the situation of the booklet division mode, wherein page 1 and page 2 are outputted without conducting post processing after forming an image on the transfer sheet based on image data of document P, and page 3-page 5 are outputted as a booklet after conducting stapling processing, and FIG. 3(D) also shows the situation wherein orientations of images on page 3-page 5 to be outputted as a booklet are rotated for outputting by 180° from the orientation of the image of document P, and orientations of images for page 1 and page 2 to be outputted without being subjected to post processing are also rotated for outputting by 180° from the orientation of the image on document P.

In this case, though orientations of images formed on page 1 and page 2 of transfer sheets to be subjected to no post processing and orientations of images on page 3-page 5 of transfer sheets to be outputted as a booklet after being subjected to post processing are rotated by 180° from the orientation of the image of document P, it is not necessary for a user to equalize orientations of images when or after taking out transfer sheets Pd from sheet-ejection tray T of the post processing apparatus, because orientations of images formed on transfer sheets Pd to be outputted are equalized on page 1-page 5. Therefore, the aforesaid erroneous operations in the case of rotating the orientation of the image are not caused, resulting in high reliability and highly improved operating efficiency.

Meanwhile, in order to equalize orientations of images on transfer sheets to be outputted, it is necessary to rotate either the transfer sheets which are not subjected to post processing, or the transfer sheets which are subjected to post processing. When conducting post processing in general, an angle for rotating transfer sheets varies variously because of the relationship between installation positions for the stapling device and a punching device for conducting post processing and a position for desired post processing. Therefore, it is preferable to rotate orientations of images on transfer sheets which are not subjected to post processing to make them equal to those of images on transfer sheets which are subjected to post processing.

A calculation standard for an angle to rotate an image formed on a transfer sheet will be explained as follows, referring to FIG. 4(A) and FIG. 4(B). FIG. 4(A) and FIG. 4(B) show relationship between positional threesome relation for the post processing apparatus, a document and a transfer sheet to be outputted and an angle for rotating a transfer sheet for conducting post processing at a specified position on the transfer sheet that is specified for post processing.

FIG. 4(A) is one showing relationship between a post processing apparatus and the document, as well as the transfer sheet to be outputted, in which document P on the input side, is conveyed by ADF 30 to a reading position on image forming apparatus 20, where image information of the document is read by a reading unit of the image forming apparatus 20. Consecutively, an image is formed on a transfer sheet based on the image information on the document which is read by the image forming apparatus 20, and processing for stapling transfer sheets with stapling device (stapler) SP, for example, provided on post processing apparatus 40 is conducted. After that, transfer sheet P1, on which an image is formed and post processing is conducted at specified position PA for post processing, is outputted to sheet-ejection tray T on the post processing apparatus, when the transfer sheet is conveyed in the direction of arrow X, which is shown as the situation.

Since the installation position of a stapling device, for example, on the post processing apparatus, is fixed because of mechanical restriction in general, as stated above, the transfer sheet is rotated for conducting post processing at specified position PA for post processing on the transfer sheet.

FIG. 4(B) is one showing relationship for an angle for rotating a transfer sheet for conducting post processing at a specified position PA on the transfer sheet, in which the axis of ordinates represents the state of the document on the input side, while, the axis of abscissas represents the state of a transfer sheet on the output side. Incidentally, a rectangular frame shows a form of a sheet of a document or a transfer sheet, and a character A described in the rectangular frame shows an orientation of the image that makes an orientation described correctly to be "upward direction".

In the present embodiment, when image information is not rotated, an orientation of an image formed on a transfer sheet is a direction perpendicular to the conveyance direction (direction of arrow X) for document P and transfer sheet P1 on which an image is formed, as shown on FIG. 4(A), and the orientation in which the characters "ABC" formed on transfer sheet P1 are described correctly, namely, "upward direction" shown in FIG. 4(B) is made to be the standard direction.

As shown in FIG. 4(B), the state of a document that is placed at a document placement position on ADF 30 includes an occasion wherein a longitudinal direction of a page surface of a document is in a direction perpendicular to the conveyance direction for the document, as an orientation of a page surface of the document, for example, and an occasion wherein a longitudinal direction of a page surface of a document is in parallel to the conveyance direction, and orientations of an image on the document include an upward direction, a leftward direction, a downward direction and a rightward direction.

The state of a transfer sheet to be outputted, namely, the state of a transfer sheet on sheet-ejection tray T, includes, in the same way as the state of a document, an occasion wherein a longitudinal direction of a transfer sheet is in a direction perpendicular to the conveyance direction for the transfer sheet, as an orientation of a transfer sheet, and an occasion wherein the longitudinal direction of a transfer sheet is in parallel to the conveyance direction, and when conducting stapling (stapling processing) and punching (punching processing), for example, there are occasions of stapling (one spot on the left), stapling (one spot on the right), stapling (left 2: two spots on the left) punching (left: two holes on one spot on the left), stapling (right 2: two spots on the right) punching (right: two holes on one spot on the right), stapling (top 2: two spots on the upper part) and punching (top: two holes on one spot on the upper part).

In the present embodiment, the relationships shown in FIG. 4(B) are stored in memory 160, shown in FIG. 2.

For example, when post processing conditions, in which the input side is upward and the output side is stapled (one spot on the left), are selected on display unit DP on control panel CP of image forming apparatus 20, it is understood that the state of the output side is obtained, if information control circuit 120 of control circuit EC causes image process circuit 140 to operate to rotate image information on the input side by 180° to conduct post processing at prescribed position PA for post processing in a transfer sheet.

Therefore, if a transfer sheet not subjected to post processing is rotated based on the aforesaid standard, the orientation of an image formed on a transfer sheet not subjected to post processing agrees with that of an image on a transfer sheet subjected to post processing on the sheet-ejection tray T of the post processing apparatus, as shown on FIG. 3(D).

Meanwhile, though an image formed on a transfer sheet subjected to post processing is rotated based on the standard shown on FIG. 4(B) in the present embodiment, how to rotate an image formed on a transfer sheet subjected to post processing is not limited to the foregoing, and it may also be changed depending on the post processing apparatus to be used.

FIG. 5 shows an example of display of selection and establishment of output conditions. In the present embodiment, for example, the display screen shown in FIG. 5, is indicated on display unit DP of a touch panel type in control panel CP.

On this display screen, the condition that document size (a) is A4 (a1) and a placement is longitudinal placement (b), for example, is selected, and a condition that sheet-supply (c): is automatic (c1) and copy quantity (d) is one (d1) is selected. For the post processing, it is understood that a condition of one spot stapling (e1) is selected as stapling processing (e), and the condition of upper side on the left (f1) is selected as stapling spot (f).

FIG. 6 shows an example of selection and display of establishment for detailed conditions of post processing. Though detailed explanation of the method of establishment will be omitted, it is to be understood that, in the case of the state shown in FIG. 3(*d*), a booklet division mode wherein no post processing is conducted on page 1 and page 2 and one spot stapling (1 Staple) is to be conducted on pages 3-5, for example, is selected and established at selection-establishment condition display unit (g) on a display screen displayed on display unit DP of a touch panel type in control panel CP.

Next, control of rotation for an image formed on a transfer sheet will be explained as follows, referring to the flow chart shown in FIG. 7. As an assumption, the image forming apparatus is a copying machine in the present embodiment. It is further assumed that a booklet division mode in which a transfer sheet subjected to post processing and a transfer sheet not to be subjected to post processing coexist in 1 JOB to be outputted is provided. It is further assumed that control of rotation, for an image formed on a transfer sheet, is carried out for image data of a one page unit forming an image on a transfer sheet. After the control of rotation for an image is carried out, it is assumed that an image is formed on a transfer sheet at an established angle of rotation and the transfer sheet is ejected. Meanwhile, an explanation will be given referring to FIG. 1-FIG. 6 properly, as occasion demands.

(ST1)

This is a step to acquire document information. For example, CPU 110 operates information control circuit 120 to acquire document information (document size, orientation of image or the like) necessary for calculation of an angle of rotation, to rotate an orientation of an image on a transfer sheet not to be subjected to post processing, and stores the document information in memory 160 so that the control thereafter may be practiced promptly, to advance to ST2.

(ST2)

This is a step to acquire transfer sheet information. In the same way as in ST1, CPU 110 operates information control circuit 120 to acquire transfer sheet information (such as transfer sheet size), and stores the transfer sheet information in memory 160, to advance to ST3.

(ST3)

This is a step to judge whether the post processing is selected and established or not. Information control circuit 120 acquires information about an established operation mode, and advances to ST9 when a post processing mode for practicing post processing is not selected, or advances to ST4 when the post processing mode is selected.

(ST4)

This is a step to acquire post processing information. When the post processing mode is set, the information control circuit 120 acquires post processing information as the established detail post processing conditions, for the post processing mode selected and established by control panel CP and display means DP being an input means of a touch panel type representing operation input means 200.

For example, in the aforesaid step, information about a type of post processing such as stapling and punching, and about positions such as a position to conduct post processing such as stapling and punching, for example, positions of one spot on the left and two spots on the right, and post processing mode information such as a booklet division mode wherein a transfer sheet subjected to post processing and a transfer sheet not to be subjected to post processing coexist and a collective post processing mode wherein a transfer sheet not to be subjected to post processing does not coexist, are acquired together, and a step advances to ST5.

(ST5)

This is a step to judge whether the mode is a booklet division mode or not. When the booklet division mode is judged to be selected and set in the post processing information acquired by the information control circuit 120, a step advances to ST6, and when the booklet division mode is judged not to be selected, namely, when a post processing mode other than the booklet division mode, for example, a collective processing mode is judged to be selected, the process advances to ST10.

(ST6)

This is a step to determine the standard for rotation. In the present embodiment, when the information control circuit 120 sets a standard for rotation on image process circuit 140 based on a standard represented by an orientation of an image on a transfer sheet subjected to post processing, the process advances to ST7.

(ST7)

This is a step to calculate an angle of rotation. The information control circuit 120 operates image process circuit 140 to calculate an angle of rotation for rotating image data for an orientation of an image on a transfer sheet not to be subjected to post processing on a one page unit based on the established standard for rotation, and on information such as a document size, a transfer sheet size and an orientation of the image, all acquired in advance, and conducts image processing based on the rotated image data so that an image may be formed on a transfer sheet and the transfer sheet may be outputted, to advance to ST8.

Incidentally, in the present embodiment, a standard for calculation of rotation for an image shown in FIG. 4(B) can be applied, as one example.

(ST8)

This is a step to judge whether a rotated image can fit in a transfer sheet or not. The information control circuit 120 assesses the rotated image data based on information of a document size, a transfer sheet size and of an orientation of an image, all acquired in advance, and when it judges that the rotated image can fit well on the transfer sheet, it forms an image on the transfer sheet based on rotated image data, and conducts image processing so that the transfer sheet may be outputted, to complete the control for rotation of the image.

When the rotated image is judged not to fit well on the transfer sheet, namely, when the rotated image is judged to protrude from the transfer sheet, the process advances to ST11.

For example, if the angle of rotation for image data is calculated for the document without stapling specification of landscape (lateral direction) in A4 as 180°, and when a size of the transfer sheet is A4R (lateral direction), the image after rotation fits into the transfer sheet, thus, a judgment is formed to be YES in ST8. However, in the case where a size of a transfer sheet is A4 (longitudinal direction), if the image after rotation is formed as it is on a transfer sheet in a size of A4 (longitudinal direction), the image after rotation does not fit into the transfer sheet, and a judgment is formed to be NO in ST8.

Incidentally, in the present embodiment, when a judgment is formed to be NO in ST8, an angle of rotation is calculated again. However, it is also possible to select a transfer sheet again so that an image may fit at an angle of rotation obtained in ST7. In the example stated above, a transfer sheet in A4R (lateral direction) size may be selected again.

(ST9)

This is a step to calculate an angle of rotation. When the size of the document and a direction of reading are different from the size of the transfer sheet to be outputted and from the orientation of the image to be formed, even when post processing is not specified, for example, when a document in a size of A4 in a longitudinal direction and that in a size of A4 in a lateral direction coexist, and all of transfer sheets to be outputted are in a size of A4 in a longitudinal direction, an angle of rotation is calculated to rotate the image for equalizing orientations of images formed on transfer sheets to be outputted.

Based on information including a document size and a transfer sheet size and image orientations acquired in advance, when the information control circuit 120 judges that a direction are different, such as a longitudinal direction and a lateral direction, in document reading directions on the input side and transfer sheet outputting directions on the output side, the information control circuit 120 calculates an angle of rotation so that orientations of images may be equalized, corresponding to a longitudinal direction or a lateral direction of the established output direction for the transfer sheet, so that image information of the document may not protrude and an image is formed on the transfer sheet based on the rotated image data for output as image processing to complete the image rotation control.

(ST10)

This is a step to calculate an angle of rotation. When a booklet division mode is not established although post processing is selected and established, the post processing is carried out, for example, for all transfer sheets as a collective processing mode. In this case again, an angle of rotation is calculated, in the same way as in ST9, to rotate an orientation of an image formed on a transfer sheet, depending on an occasion where a size of a document and a reading direction are different from a size of a transfer sheet to be outputted and an orientation of an image to be formed, and on a specified position for the post processing. Then, image data are rotated based on the calculated angle of rotation, and an image is formed on a transfer sheet based on the rotated image data, whereby, the transfer sheet is subjected to image processing to be outputted, and rotation control for the image is completed.

(ST11)

This is a step to calculate an angle of rotation. In the case where the size of the document and the direction of reading are different from the size of a transfer sheet to be outputted and from the orientation of an image to be formed, when the image rotated by information control circuit 120 is judged to protrude from the transfer sheet, the angle of rotation for rotating image data is calculated again based on information such as a document size, a transfer sheet size and an orientation of an image all acquired in advance, by giving priority to the condition that an image does not protrude beyond the transfer sheet, and an image is formed on a transfer sheet based on the rotated image data, whereby, the transfer sheet is subjected to image processing to be outputted, and rotation control for the image is then completed.

Though the invention has been explained above, referring to the present embodiment, the invention is not limited to the embodiment. The present embodiment makes it possible to provide an image forming system, its image forming method and image forming program in an image forming apparatus equipped with a post processing apparatus capable of saving time for operations for a user to equalize orientations of images formed on transfer sheets when taking out of the post processing apparatus or after taking out, when a transfer sheet to be subjected to post processing and a transfer sheet not to be subjected to post processing coexist in the same JOB to be outputted, and of equalizing orientations of images on transfer sheets easily with simple operations.

In the present embodiment, a standard for rotation is determined by an image processing unit so that an orientation of an image formed on a transfer sheet subjected to post processing may agree with an orientation of an image formed on a transfer sheet not to be subjected to post processing so as to conduct image processing for rotating image information for forming an image on a transfer sheet, therefore, an image is formed based on a series of image information, and when taking out booklets and transfer sheets ejected to the tray of the post processing unit, a user can take out them easily without equalizing orientations of images, thus, it has become possible to provide an image forming system, and its image forming method as well as image forming program, wherein working hours are shortened and working efficiency is sharply improved.

Further, due to an arrangement wherein an image does not protrude from a transfer sheet even when the image is rotated, it is not necessary to check protruding of an image for a booklet and a transfer sheet on which the rotated image is formed, thus, it has become possible to provide an image forming system capable of forming images which are highly reliable and are of high grade and to provide its image forming method as well as an image forming program.

Meanwhile, in the present embodiment, the image forming apparatus assumed to be a copying machine. It, however, may naturally be a printer, a facsimile machine or a multi-functional machine of the foregoing, in addition to the copying machine.

In the above embodiment, if the booklet division mode is set, there is determined a rotation standard that is for rotating image information so that an orientation of an image formed on an output medium for post processing may agree with the orientation of an image formed on an output medium for no post processing, and image information is rotated based on the rotation standard. It is therefore possible to provide an image forming system, its image forming method and image forming program wherein it is not necessary to make orientations of images uniform when taking out output media ejected from the post processing apparatus, and working hours for taking out output media can be shortened, resulting in substantial improvement in working efficiency.

By conducting rotation processing on image information that is to be formed on an output medium for no post processing based on the rotation standard representing an orientation of an image formed on an output medium to be post-processed, an orientation of an image formed on an output medium for post processing agrees with that of an image formed on an output medium for no post processing. Thus, it is possible to provide an image forming system, its image forming method and image forming program wherein, it is not necessary to make orientations of images uniform when taking out output media ejected from the post processing apparatus, and working hours for taking out output media can be shortened, resulting in substantial improvement in working efficiency.

By determining a rotation angle for image information for an image formed on an output medium for no post processing, and by conducting rotation processing on image information for an image formed on an output medium for no post processing based on the rotation angle, for equalizing orientations of images formed on an output medium for post processing and on an output medium for no post processing, an orientation of an image formed on an output medium for post processing agrees with that of an image formed on an output medium for no post processing. Thus, it is possible to provide an image forming system, its image forming method and image forming program wherein, it is not necessary to equalize orientations of images when taking out output media ejected from the post processing apparatus, and working hours for taking out output media can be shortened, resulting in substantial improvement in working efficiency.

By acquiring post processing information, and by judging whether a booklet division mode is set or not when the post processing is judged to be specified in an operation mode to be practiced, an orientation of an image formed on an output medium for post processing agrees with that of an image formed on an output medium for no post processing when the booklet division mode is set. Therefore, it is possible to provide an image forming system, its image forming method and image forming program wherein, it is not necessary to equalize orientations of images when taking out output media ejected from the post processing apparatus, and working hours for taking out output media can be shortened, resulting in substantial improvement in working efficiency.

Since it is arranged to conduct rotation processing on image information for forming an image on an output medium for no post processing when a booklet division mode is judged to be set, orientations of images formed on an output medium for post processing and on an output medium for no post processing are equalized.

Therefore, it is possible to provide an image forming system, its image forming method and image forming program wherein, it is not necessary to equalize orientations of images when taking out output media ejected from the post processing apparatus, and working hours for taking out output media can be shortened, resulting in substantial improvement in working efficiency.

Since it is arranged to re-determine the rotation standard and thereby to conduct rotation processing on the image information based on the rotation standard re-determined, when the image which results from the rotation processing on image information based on the rotation standard is judged to protrude from the output medium, it is possible to provide as an image forming system, its image forming method and image forming program capable of forming a high grade image that does not protrude from an output medium and is high in reliability.

What is claimed is:

1. An image forming system, comprising:

an image forming section in which an image is formed on an output medium based on image information;

a post processing section in which prescribed post processing is performed on the output medium on which the image is formed by the image forming section;

a booklet division mode judgment section for judging whether a booklet division mode is set or not before the image forming so as to reflect a result of the judgment in the image forming, wherein in the booklet division mode, an output medium on which prescribed post processing is to be conducted and an output medium on which prescribed post processing is not to be conducted coexist among the plural output media on which images are to be formed based on a series of image information, and wherein the output medium on which prescribed post processing is not to be conducted has thereon a first image whose orientation is not restricted and the output medium on which prescribed post processing is to be conducted has thereon a second image whose orientation is restricted because of the post processing;

an image orientation judgment section for judging the restricted orientation of the second image if the booklet division mode judgment section judges that the booklet division mode is set;

a rotation standard setting section which determines a rotation standard for rotating image information of the first image so that the orientation of the first image in the series of image information is made to agree with the judged orientation of the second image in the same series of image information; and an image processing section which conducts rotation processing on the image information of the first image based on the determined rotation standard.

2. The image forming system of claim 1, wherein the image processing section determines an orientation of the second image which is to be formed on an output medium on which the prescribed post processing is to be conducted, to be the rotation standard, and conducts rotation processing on the image information for forming the first image on the output medium on which prescribed post processing is not to be conducted, based on the rotation standard.

3. The image forming system of claim 1, wherein the judgment section judges whether or not a post processing is designated in an operation mode to be practiced, and wherein the judgment section acquires post processing information and judges whether the booklet division mode is set or not, if the judgment section judges that the post processing is designated in the operation mode to be practiced.

4. The image forming system of claim 3, wherein, if the judgment section judges that the booklet division mode is set, the image processing section is operated so as to conduct rotation processing on image information for forming the first image on an output medium on which prescribed post processing is not conducted.

5. The image forming system of claim 1, wherein, if the first image after rotation processing to be conducted on the image information based on the rotation standard, is judged to protrude from the output medium, a rotation standard is determined again, and rotation processing is conducted on the image information based on the rotation standard determined again.

6. The image forming system of claim 1, wherein the post processing section can practice the prescribed post processing only at a predetermined position.

7. The image forming system of claim 1, wherein the prescribed post processing is a processing to be conducted on the output medium.

8. An image forming system, comprising:

an image forming section in which an image is formed on an output medium based on image information;

a post processing section in which prescribed post processing is performed on the output medium on which the image is formed by the image forming section;

a booklet division mode judgment section for judging whether a booklet division mode is set of not before the image forming so as to reflect a result of the judgment in the image forming, wherein in the booklet division mode, an output medium on which prescribed post processing is to be conducted and an output medium on which prescribed post processing is not to be conducted coexist among the plural output media on which images are to be formed based on a series of image information, and wherein the output medium on which prescribed post processing is not to be conducted has thereon a first image whose orientation is not restricted and the output medium on which prescribed post processing is to be conducted has thereon a second image whose orientation is restricted because of the post processing;

an image orientation judgment section for judging the restricted orientation of the second image if the booklet division mode judgment section judges that the booklet division mode is set;

a rotation processing a rotation angle setting section which determines a rotation angle of image information for the first image in the series of image information so that the orientation of the first image is made to agree with the judged orientation of the second image in the same series of image information; and an image processing section which conducts rotation processing on the image information of the first image based on the determined rotation angle.

9. The image forming system of claim 8, wherein the judgment section judges whether or not a post processing is designated in an operation mode to be practiced, and wherein the judgment section acquires post processing information and judges whether the booklet division mode is set or not, if the judgment section judges that the post processing is designated in the operation mode to be practiced.

10. The image forming system of claim 9, wherein, if the judgment section judges that the booklet division mode is set, the image processing section is operated so as to conduct rotation processing on image information for forming the first image on an output medium on which prescribed post processing is not conducted.

11. The image forming system of claim 8, wherein, if the first image after rotation processing to be conducted on the image information based on the rotation standard, is judged to protrude from the output medium, a rotation standard is determined again, and rotation processing is conducted on the image information based on the rotation standard determined again.

12. The image forming system of claim 8, wherein the post processing section can practice the prescribed post processing only at a predetermined position.

13. The image forming system of claim 8, wherein the prescribed post processing is a processing to be conducted on the output medium.

14. The image forming system of claim 8, wherein the image processing section is configured to determine a rotation angle of image information without first determining a rotation standard, if the booklet division mode judgment section judges that the booklet division mode is not set.

15. An image forming method comprising steps of:

forming an image on an output medium based on image information;

conducting post processing on the output medium on which the image is formed;

judging whether or not a booklet division mode is set before the image forming so as to reflect a result of the judgment in the image forming, wherein in the booklet division mode, an output medium on which prescribed post processing is to be conducted and an output medium on which prescribed post processing is not to be conducted coexist among the plural output media on which images are to be formed based on a series of image information, and wherein the output medium on which prescribed post processing is not to be conducted has thereon a first image whose orientation is not restricted and the output medium on which prescribed post processing is to be conducted has thereon a second image whose orientation is restricted because of the post processing;

judging the restricted orientation of the second image if the booklet division mode is judged to be set;

determining a rotation standard for rotating image information so that the orientation of the first image in the series of image information is made to agree with the judged orientation of the second image in the same series of image information; and conducting rotation processing on the image information of the first image based on the determined rotation standard.

16. An image forming method comprising steps of:

forming an image on an output medium based on image information;

conducting post processing on the output medium on which the image is formed;

judging whether or not a booklet division mode is set before the image forming so as to reflect a result of the judgment in the image forming, wherein in the booklet division mode, an output medium on which prescribed post processing is to be conducted and an output medium on which prescribed post processing is not to be conducted coexist among the plural output media on which images are to be formed based on a series of image information, and wherein the output medium on which prescribed post processing is not to be conducted has thereon a first image whose orientation is not restricted and the output medium on which prescribed post processing is to be conducted has thereon a second image whose orientation is restricted because of the post processing;

judging the restricted orientation of the second image if the booklet division mode is judged to be set;

determining a rotation angle of image information for the first image in the series of image information so that the orientation of the first image is made to agree with the judged orientation of the second image in the same series of image information; and conducting rotation processing on the image information of the first image based on the determined rotation angle.

17. The image forming method of claim 16, further comprising the step of determining a rotation angle of image information without first determining a rotation standard, if the booklet division mode judgment section is judged not to be set.

18. A non-transitory, computer-readable recording medium which stores an image forming program to conduct in an image forming apparatus, the program comprising steps of:

forming an image on an output medium based on image information;

conducting post processing on the output medium on which the image is formed;

judging whether or not a booklet division mode is set before the image forming so as to reflect a result of the judgment in the image forming, wherein in the booklet division mode, an output medium on which prescribed post processing is to be conducted and an output medium on which prescribed post processing is not to be conducted coexist among the plural output media on which images are to be formed based on a series of image information, and wherein the output medium on which prescribed post processing is not to be conducted has thereon a first image whose orientation is not restricted and the output medium on which prescribed post processing is to be conducted has thereon a second image whose orientation is restricted because of the post processing;

judging the restricted orientation of the second image if the booklet division mode is judged to be set;

determining a rotation standard for rotating image information so that the orientation of the first image in the series of image information is made to agree with the judged orientation of the second image in the same series of image information; and conducting rotation processing on the image information of the first image based on the determined rotation standard.

19. A non-transitory computer-readable recording medium which stores an image forming program to conduct in an image forming apparatus, the program comprising steps of:

forming an image on an output medium based on image information;

conducting post processing on the output medium on which the image is formed;

judging whether or not a booklet division mode is set before the image forming so as to reflect a result of the judgment in the image forming, wherein in the booklet division mode, an output medium on which prescribed post processing is to be conducted and an output medium on which prescribed post processing is not to be conducted coexist among the plural output media on which images are to be formed based on a series of image information, and wherein the output medium on which prescribed post processing is not to be conducted has thereon a first image whose orientation is not restricted and the output medium on which prescribed post processing is to be conducted has thereon a second image whose orientation is restricted because of the post processing;

judging the restricted orientation of the second image if the booklet division mode is judged to be set;

determining a rotation angle of image information for the first image in the series of image information so that the orientation of the first image is made to agree with the judged orientation of the second image in the same series of image information; and conducting rotation processing on the image information of the first image based on the determined rotation angle.

20. The computer-readable recording medium of claim 19, further comprising the step of determining a rotation angle of image information without first determining a rotation standard, if the booklet division mode judgment section is judged not to be set.

* * * * *